United States Patent Office 3,365,664
Patented Jan. 23, 1968

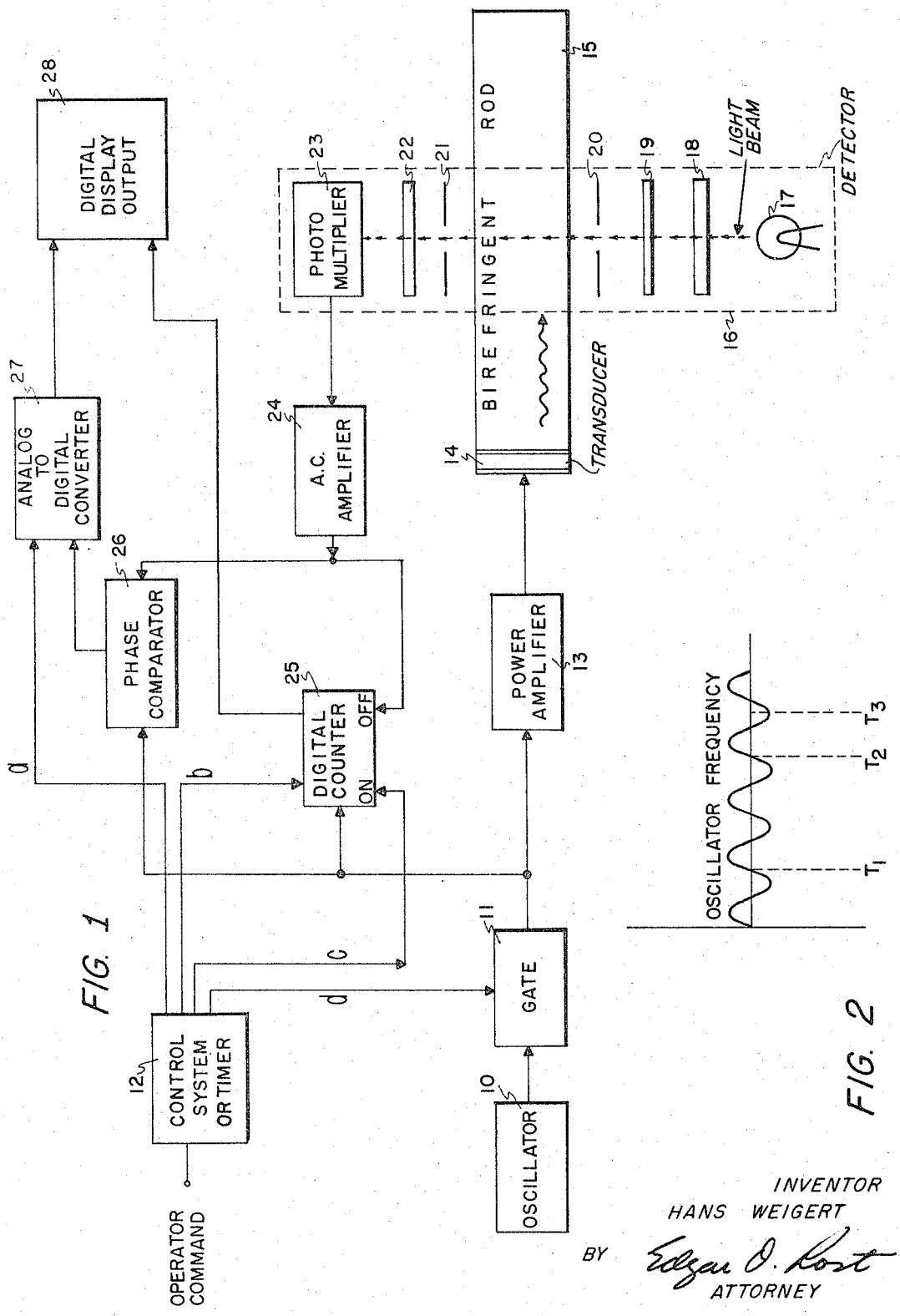

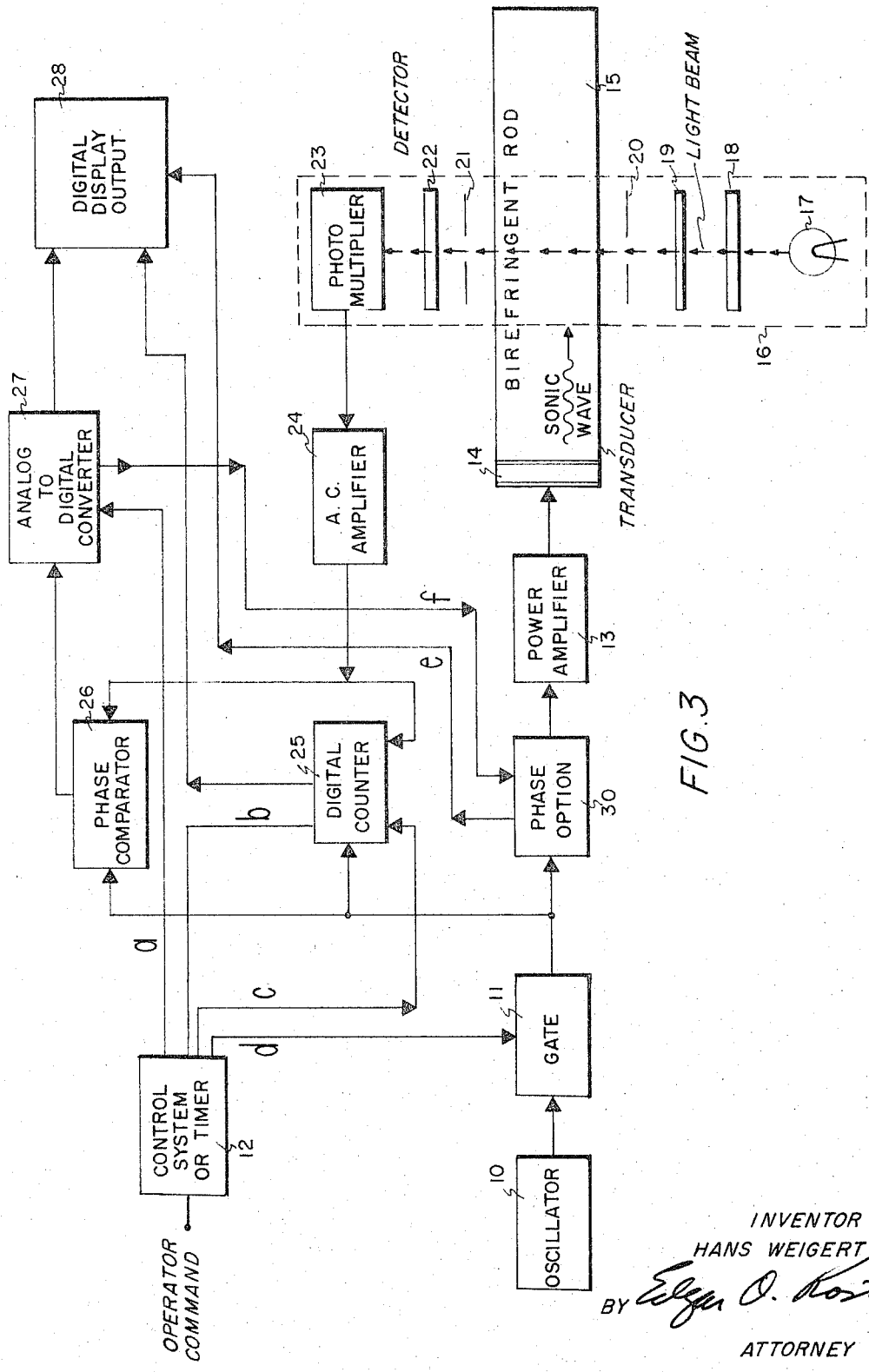

3,365,664
DISTANCE MEASURING APPARATUS
Hans Weigert, Falls Church, Va., assignor to Raytheon Company, Lexington, Mass., a corporation of Delaware
Filed Sept. 1, 1964, Ser. No. 393,637
1 Claim. (Cl. 324—68)

ABSTRACT OF THE DISCLOSURE

Mensuration apparatus for measuring small distances of the order of centimeters such as the traverse of a movable head of a machine tool from a fixed reference point. The technique involves the propagation of acoustical wave energy in a photoelastic delay line having birefringent properties and the interception of the wave energy by optical detection means. Means are also disclosed for computing the distance measurements on the basis of time delay intelligence.

---

Precision machining of parts often requires that tolerances in the order of microns be obtained. At the present time incremental line counters are used or visual systems, such as micrometers. All of the above presently available systems are subject to error, especially where accuracy in the order of microns is required. Additionally, the present day photographic mensuration art, as applied to photoreconnaissance, requires that extremely accurate distance measurements be made.

Accordingly, it is the principal object of this invention to provide a new and improved distance measuring apparatus.

It is a further object to provide a measuring apparatus suitable for obtaining accuracies in the order of microns.

According to the present invention there is provided an apparatus for converting a distance or length measurement into a time measurement. In the particular embodiments shown the length measurement is carried out by measuring the delay between the application of a gated burst of high frequency energy to one end of a photoelastic delay line and the interception of this energy by a beam of light situated along the line, this point of interception being movable with respect to the input end. It is therefore proposed that the photoelastic delay line and monochromatic light source be adapted to any desired machine tool or photographic apparatus as a means for accurate measurement of distances. Either of the foregoing mensuration means may be affixed to the movable head of for example a lathe controlled by a precise lead screw while the table supports the remaining perpendicularly disposed component as a fixed reference point.

In the preferred embodiment the measurement is carried out in two steps. The first step is digital and involves the counting of the complete number of cycles of the high frequency energy contained in the delay line between the input and the point of interception of the energy. The second measurement involves measuring the phase of the wave of energy traveling in the delay line at the detection or interception point with reference to the input wave energy. These two measurements are then combined to yield an output signal representative of the distance or length measurement.

Other and further objects and features of the present invention will become apparent upon a careful consideration of the accompanying detailed description and drawings in which:

FIG. 1 shows a block diagram illustrating the features of the present invention;

FIG. 2 is a graph illustrating the steps in obtaining the distance measurement; and FIG. 3 is an alternative embodiment of FIG. 1 wherein a phase option device is inserted to assure further accuracy in the output measurements.

Referring now to FIG. 1, there is disclosed a system for obtaining a length measurement in accordance with the principles of this invention. A high frequency oscillator 10 is shown providing an output signal to a gate 11. In the preferred embodiment of FIG. 1 it is assumed that the oscillator 10 provides an output signal at 20 megacycles. It is to be understood that the principles of this invention apply to oscillators providing signals at either higher or lower frequencies. A control system or timer 12 is coupled to the gate 11. The control system may be a ring or chain counter. A portion of the control system or timer 12 provides a signal which permits the signal from the oscillator 10 to be applied to the power amplifier 13. Power amplifier 13 then provides an amplified signal to a transducer 14. The transducer 14 may be on of the piezoelectric type used in sonar systems. Additionally, ceramic transducers could also be used. The transducer 14 is bonded to one end of a birefringent media or solid rod 15. In the preferred embodiment commercial materials having suitable birefringent properties are glass and fused quartz. These materials can be fabricated to form the rod 15. Additionally, nitrobenzene or other suitable liquids placed in a transparent chamber desirably of a high grade optical glass could also be utilized as a birefringent medium.

For the purposes of this invention it is assumed that the transducer 14 and the birefringent rod 15 are stationary. The movable oprtion of the length measuring system is the apparatus shown as the detector 16. The detector 16 is positioned at right angles to the rod 15 and comprises a light source 17 which is preferably monochromatic. Among the suitable types of monochromatic light sources available is the gallium arsenide semiconductor diode. Other monochromatic light sources, such as gaseous discharge devices, could be utilized. The light source 17 transmits a beam of light along the path shown by the arrows in FIG. 1.

The light beam first passes through a polarizer 18 which only permits the E vector at 90° to pass through. A $\lambda/4$ plate 19 is then utilized to circularly polarize the light passing therethrough. Collimators 20 and 21 are positioned on either side of the birefringent rod 15. It has been determined that the slit openings of the collimators 20 and 21 should be in the order of $.37\lambda$ for optimum operating response. A polarizer or analyzer 22 is then positioned in front of the collimator 21 to permit only the E field vector to be received by a photomultiplier 23. It is to be understood that polarizer 22 could be oriented at a different angle and still provide an operable system. The signal applied by the transducer 14 to the birefringent rod 15 produces an acoustical wave or pressure stress pattern within the rod 15. This acoustical or pressure wave pattern in turn modulates the E field vector which is passing at right angles through the birefringent rod 15.

The photomultiplier 23 responds the instant the acoustical wave front passes or intercepts the beam of light and provides an output signal to an A.C. amplifier 24. The combination of the birefringent rod, the transducer and the detector is disclosed in Patent No. 2,418,964 issued to D. L. Arenberg on Apr. 15, 1947. In this patent Arenberg describes the theory of operation of the combination of the transducer 14, the birefringent rod 15 and the detector 16.

In FIG. 1 there is also shown a digital counter 25 of the type commonly utilized in the digital computer art. The counter 25 is coupled to the control system or timer 12 which provides a signal upon operator command to clear counter 25 prior to making a measurement. After the first timed pulse from the timer 12, a second timed pulse is applied to the counter 25 at the same time that the timed signal is applied to the gate 11. This second timed pulse turns the counter on. The counter counts the number of complete cycles which represents the distance that the acoustical wave pattern has traveled down the birefringent rod 15. Upon the passage of the acoustical wave across the light beam provided by the detector 16 a signal is provided from the A.C. amplifier to the counter 25 to turn it off. As a result the counter will count the total number of cycles, thereby giving an indication of the distance measurement in terms of cycles which are easily converted into microns.

To obtain the remaining portion of the length measurement a phase comparator 26 is utilized of the type presently available on the market. Additionally, the phase detector could be of the type utilized in phase comparison monopulse radar systems. The phase comparator 26 makes a comparison between the oscillator signal and the signal provided by the A.C. amplifier 24. The output signal from the phase comparator is then a measurement of a portion of a cycle which is not detected by the counter 25 inasmuch as the counter 25 only detects whole cycles. The signal provided by the phase comparator 26 is then converted to a digital form by an analog-to-digital converter 27. The digital signal from the counter 25 and the digital signal from the digital converter 27 are then combined and summed in a digital display device 28 to provide, in digital form, a measurement of the distance between the detector and one end of the birefringent rod 15.

Referring again to FIG. 1 and also to FIG. 2, which is a graph illustrating the steps in obtaining the distance measurement, the over-all system operation will now be described.

The oscillator 10 is free-running and continuously provides a signal to the gate 11. Upon command of the operator the control system timing cycle is initiated. Timing pulses are sent out on lines a and b from the control system to clear the analog-to-digital converter as well as the counter 25. Timing pulses are then simultaneously transmitted via lines c and d to permit the oscillator signal to be fed to the phase comparator 26, the counter 25 and the power amplifier 13. The timing pulse on line c, provided to the counter 25, simultaneously turns on the counter. These timing pulses on lines c and d may be synchronized with the oscillator 10 so as to provide a definite part of the cycle each time the counter is initiated, such as, for example, the positive going zero crossing time. The output of the gate, which is amplified by the amplifier 13, is then fed to the transducer 14 bonded to one end of the birefringent rod 15.

The birefringent rod acts as a photoelastic delay line. During this period of time the monochromatic light source 13 has been transmitting a beam of light at an angle perpendicular to the rod 15. This light beam is detected by the photomultiplier 23 and amplified by the A.C. amplifier 24. The transducer 14 induces an acoustical energy pattern or wave front into the birefringent rod 15. When the energy has reached that point in the delay line where it will be intercepted by the light beam this will be detected by the photomultiplier 23 since the acoustical wave produced by the energy will rotate the plane of polarization of the light beam. After amplification, the output from the photomultiplier is simultaneously provided to the counter 25 to turn off the counter. Inasmuch as the counter 25 has been counting the total number of cycles provided by the oscillator 10, which is contained in the delay line between the transducer 14 and the detector 16, a count of these cycles is directly related to the distance between the stationary transducer, birefringent rod and the movable detector 16.

The output from the photomultiplier 23 and the A.C. amplifier 24 is simultaneously provided to a phase comparator 26. A phase comparison between the input signal and the intercepted input signal, which has traveled down the birefringent rod, will provide an analog signal voltage which is representative of a portion of a cycle. This portion of the cycle represents a fine measurement of the distance greater than an integral number of cycles of the signal from the end of the birefringent rod to the point of interception or detection. In order to provide a digital output, the analog signal obtained from the phase comparator 26 is digitized in converter 27. The two digital signals are then added to the fine measurement representing a portion of a cycle to obtain highly accurate distance measurement between two points.

The fine and gross distance measurements can be seen in FIG. 2 which shows a representation of the distance measurement in terms of the oscillator frequency. The distance measurement is equal to the number of cycles as, for example, between $T_1$ and $T_2$, which is the gross measurement, and the phase between $T_2$ and $T_3$, which is the fine measurement.

Referring to FIG. 3, an alternative circuit is illustrated to avoid any ambiguity in the output measurment for the determination of the over-all length of traverse of the objects to be measured. In this embodiment all similar components to those shown in FIG. 1 have been similarly numbered and the additional component indicated by the numeral 30 will be referred to as the phase option circuit. To assure further accuracy in the counting of the cycles of the acoustical wave before interception by the light beam it is desirable to measure phase shift between 90° and 270° to avoid any possibility of a one-cycle error in the computations. The phase option circuit comprises a delay line exactly 180° long at the selected operating frequency of the over-all apparatus. Switching of this delay in and out may be accomplished by the utilization of reed relays in such a configuration that the characteristic impedances will be preserved. The output of the gate 11 is fed to the phase option circuit 30 where either the direct signal or a signal 180° out of phase will be selected. The output of this circuit is coupled to the analog-to-digital converter 27 and digital display output 28 by means of lines e and f. The output of the phase option circuit 30 will be applied to the power amplifier 13 to drive the transducer 14 bonded to the end of the birefringent rod. The analog part of the over-all apparatus will measure the phase shift and adjust the phase option circuit to bring the phase shift to within the desired part of the range. As a result of the incorporation of this additional component the phase of the signal will be preserved to better than 1° to further enhance the fine measurement provided as an inherent advantage of this invention.

While there has been described what is at present considered the preferred embodiment of the invention, it will be obvious to those skilled in the art that various modifications may be made therein without departing from the invention, and it is therefore aimed in the appended claims to cover all such changes and modifications which fall within the scope of the invention.

What is claimed is:

1. An apparatus comprising:

a stationary photoelastic delay line of a predetermined acoustical wavelength;

a transducer coupled to one end of said delay line;

a source of energy means coupled to said transducer for providing cyclic electrical energy to said transducer to propagate acoustical energy down said delay line;

a delay line 180° long in electrical length at the operating frequency selectively switched in and out of said energy source means and transducer circuit;

a beam of light passing through said photoelastic delay line at right angles to the line of propagation of said acoustical energy;

a detector means for detecting the passage of said acoustical energy across said beam of light;

said detector means being disposed on a movable component relative to said photoelastic delay line;

a digital counter which is gated on by the first cycle of electrical energy provided to said transducer and turned off by a signal from said detector means upon the passage of said acoustical energy across said beam of light;

a phase comparator coupled to an analog-to-digital converter for providing an output signal which is representative of the phase of the acoustical energy detected by the detector with respect to the phase of the electrical energy provided to the transducer;

the combined readings of said digital counter and phase comparator providing a measurement of the distance between said movable component and said stationary photoelastic delay line;

and means for digitally displaying the sum of the output signals provided by said digital counter and said analog-to-digital converter synchronized with the switching of said 180° delay line.

References Cited

UNITED STATES PATENTS

| | | | |
|---|---|---|---|
| 2,418,964 | 4/1947 | Arenberg | 324—68 |
| 2,604,004 | 7/1952 | Root | 324—83 XR |
| 2,665,410 | 1/1954 | Burbeck | 324—68 |
| 2,738,461 | 3/1956 | Burbeck et al. | 324—68 |
| 2,970,258 | 1/1961 | Sinclair | 324—57 |

RUDOLPH V. ROLINEC, *Primary Examiner.*

P. F. WILLE, *Examiner.*